Figure 5:
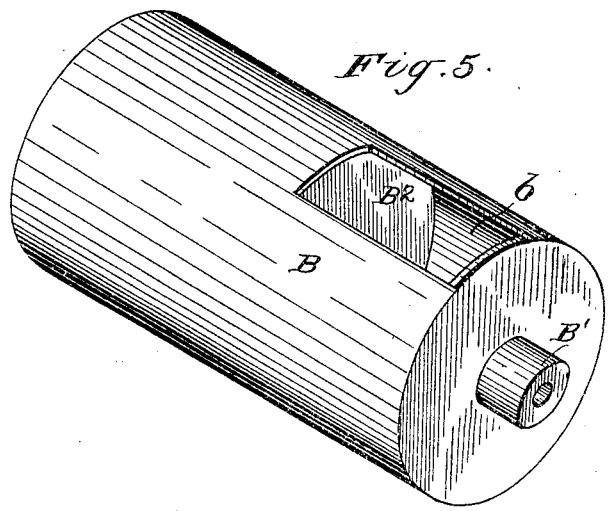

No. 807,525. PATENTED DEC. 19, 1905.
G. F. WILLIAMS.
VENTILATOR.
APPLICATION FILED MAY 9, 1902.
6 SHEETS—SHEET 1.
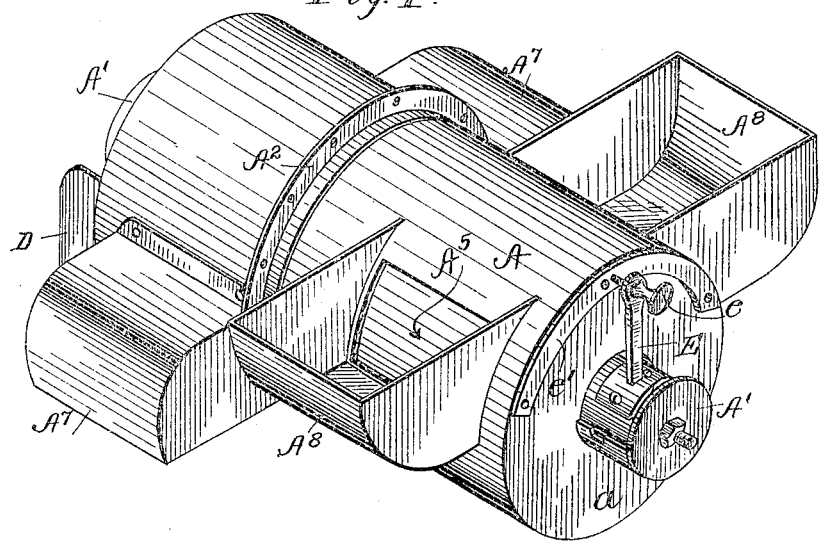
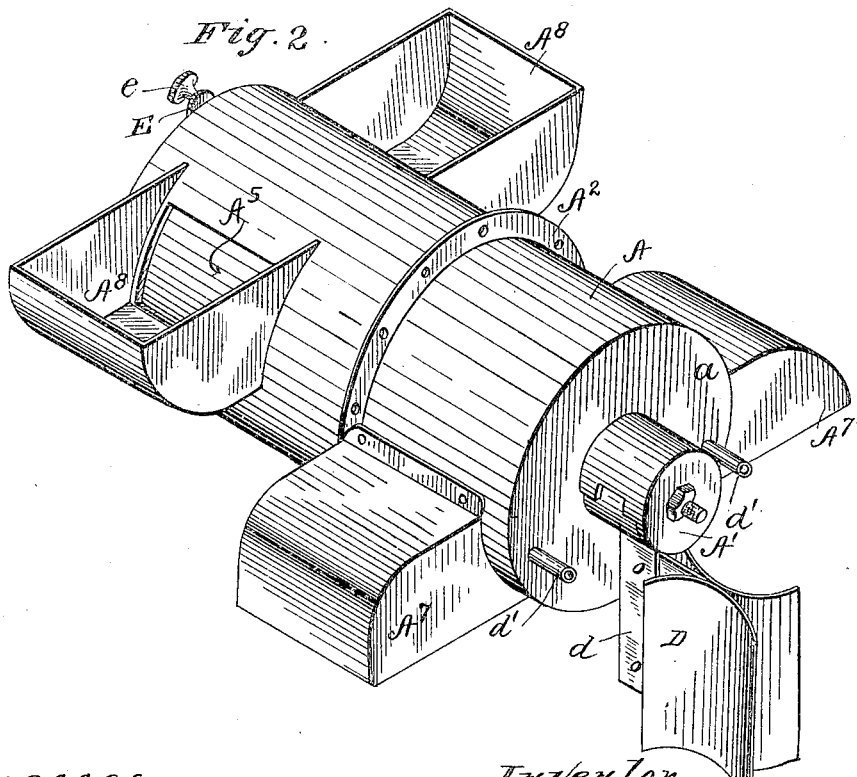
Witnesses
W. R. Edelen.
K. E. Montague.
Inventor.
Gilbert F. Williams
By L. S. Bacon
Atty.

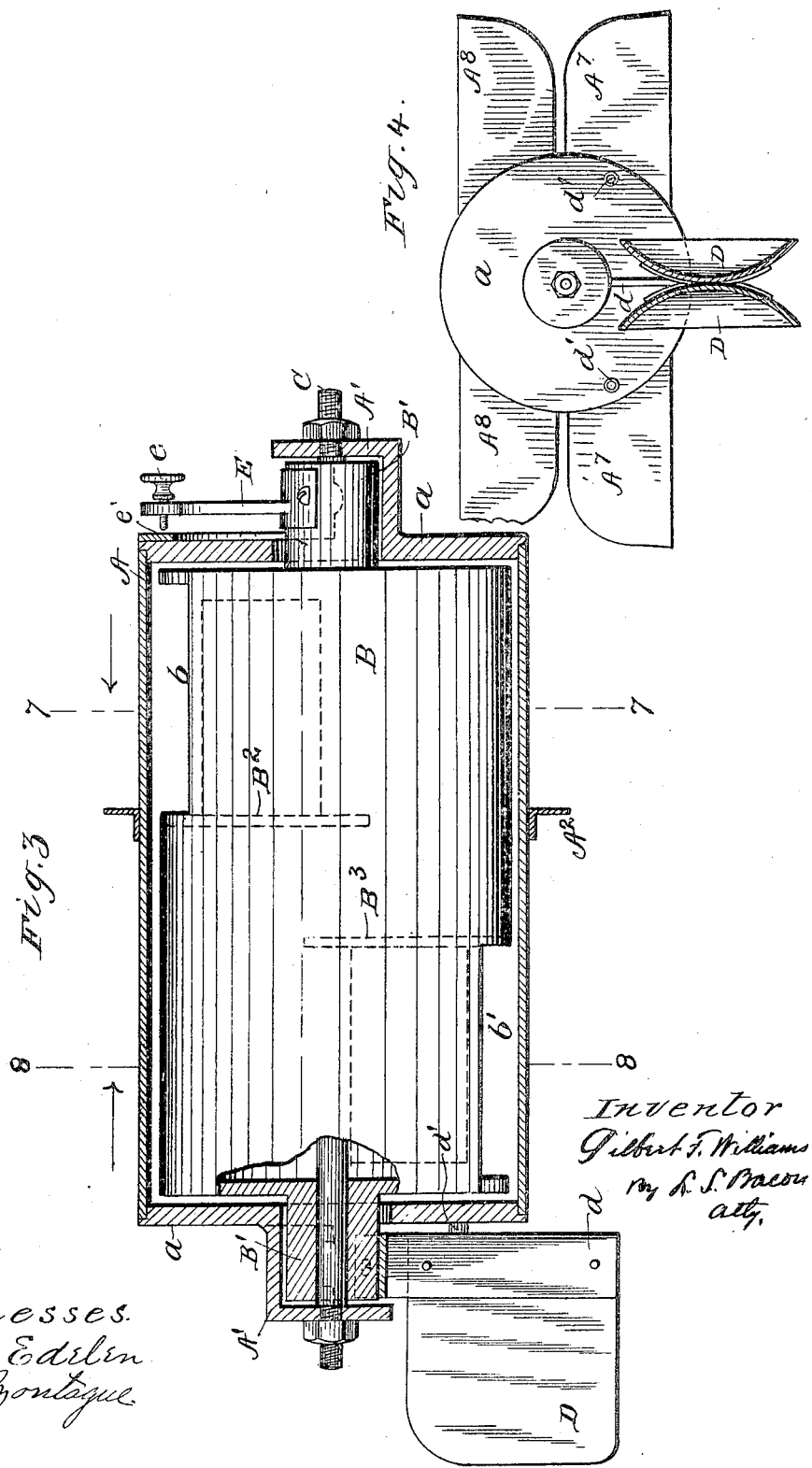

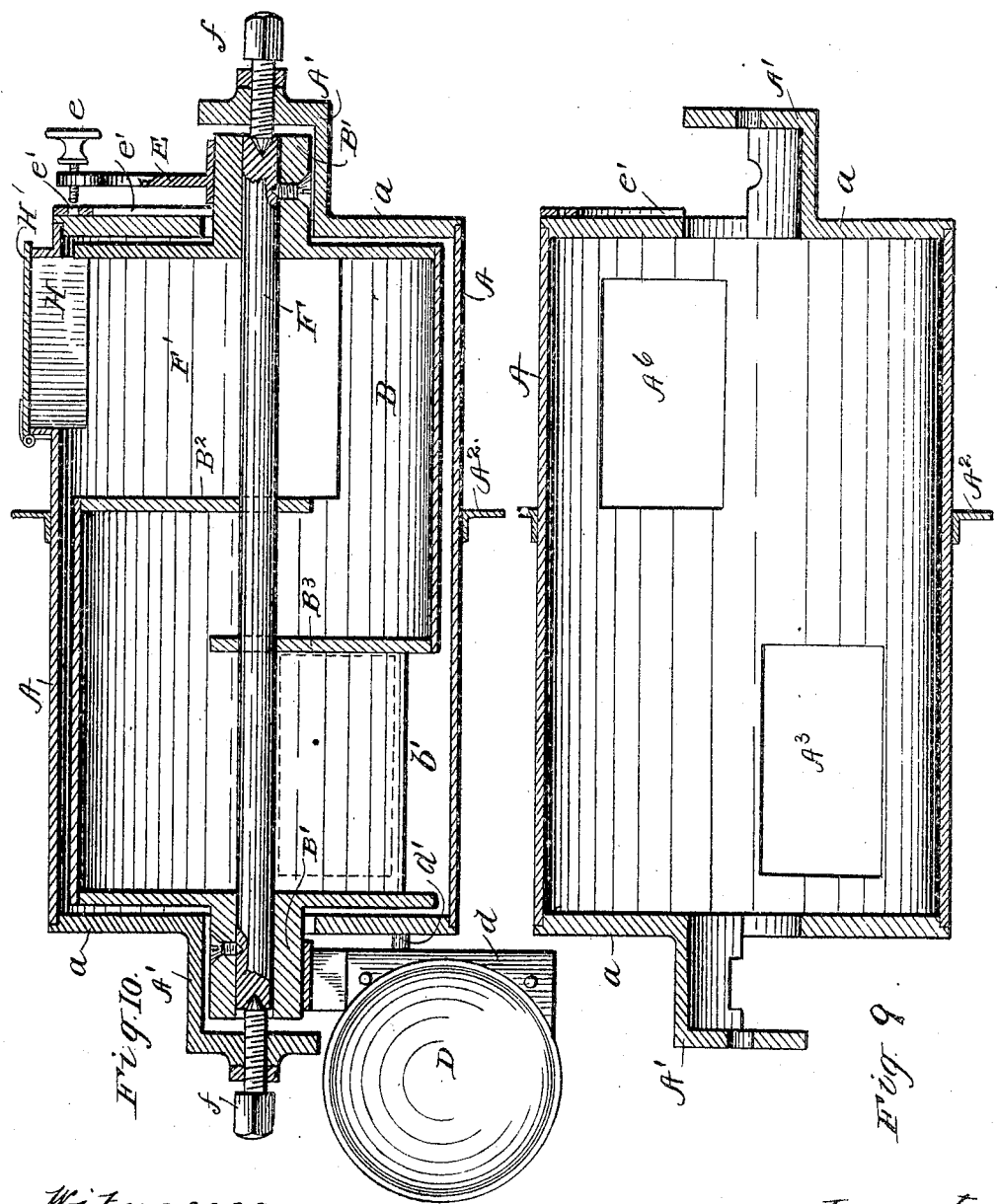

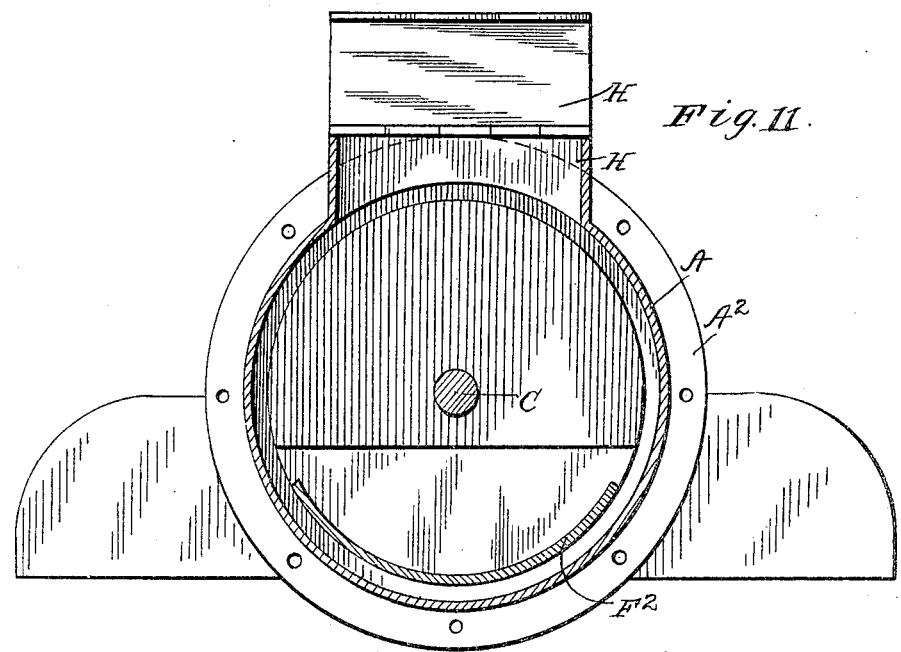

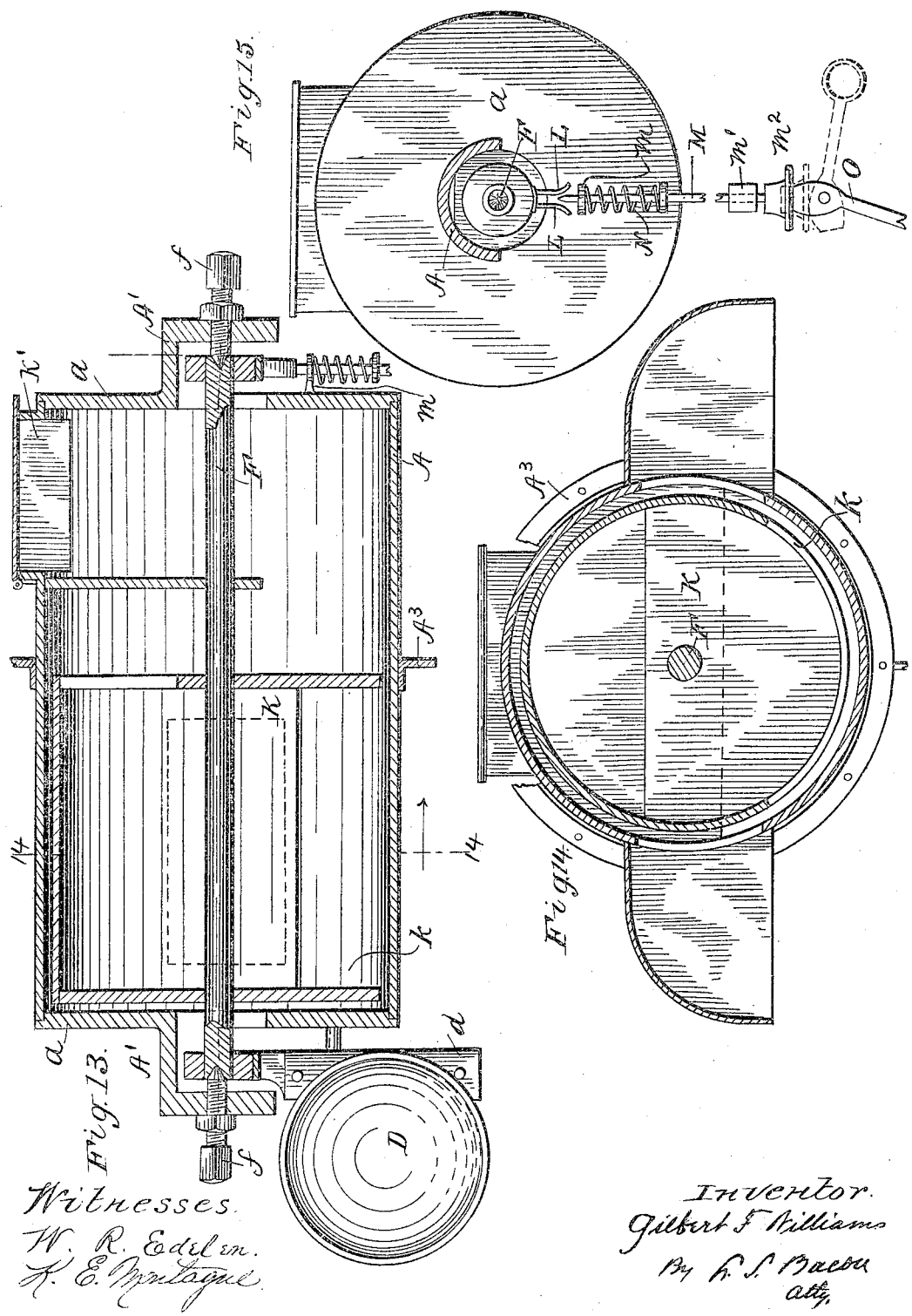

UNITED STATES PATENT OFFICE.

GILBERT F. WILLIAMS, OF WASHINGTON, DISTRICT OF COLUMBIA.

VENTILATOR.

No. 807,525.   Specification of Letters Patent.   Patented Dec. 19, 1905.

Application filed May 9, 1902. Serial No. 106,583.

*To all whom it may concern:*

Be it known that I, GILBERT F. WILLIAMS, a citizen of the United States, residing at Washington, District of Columbia, have invented certain new and useful Improvements in Ventilators; and I do hereby declare the following to be a full, clear, and exact description of the invention, such as will enable others skilled in the art to which it appertains to make and use the same.

This invention relates to an improvement in ventilators; and it is embodied in the construction hereinafter described, and defined in the claims.

The invention relates more particularly to that type of ventilator intended or designed for use in connection with vehicles, such as cars, and also for houses, offices, and other compartments wherein a fresh supply of air is needed.

An important requirement in ventilators for cars and all other ventilation is to avoid direct blasts and prevent the entering of foreign matter, such as rain, snow, hail, cinders, &c. The present invention is intended to successfully fulfil this requirement.

Therefore this invention consists in peculiarly-constructed apparatus which will prevent direct blasts and the ingress of rain, snow, hail, cinders, or other foreign matter carried by direct air-currents, which will be positioned either by being built into walls or placed in a window or other opening, which will be automatic in its adjustment, which may be set to opened or closed positions and there positively held, which in structure will embody simplicity, and which will be so shaped as to prevent the harboring of snow, hail, dirt, cinders, &c.

In the accompanying drawings is shown an embodiment of the invention in preferred and modified forms; but it is to be understood that the general principle of the invention may be employed with apparatus of widely-different forms and arrangement. Therefore various changes and modifications of the invention shown can be made without departing from the nature and principle thereof.

Figure 6:
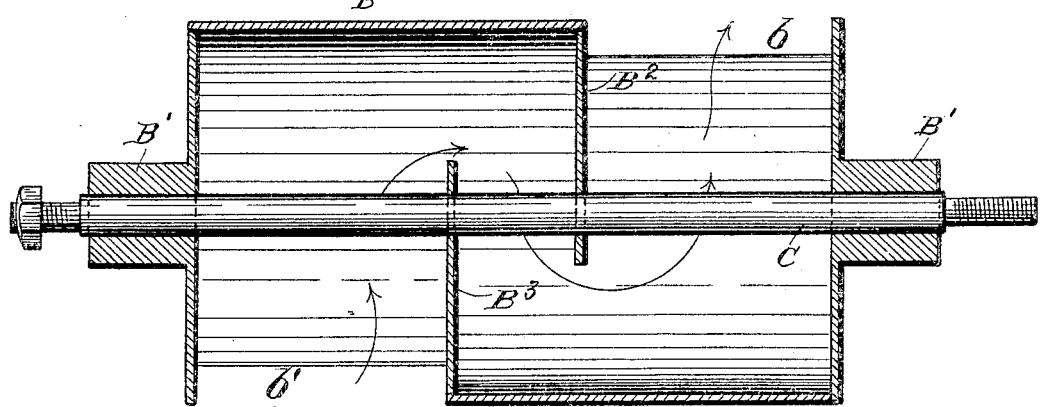
Figure 7:
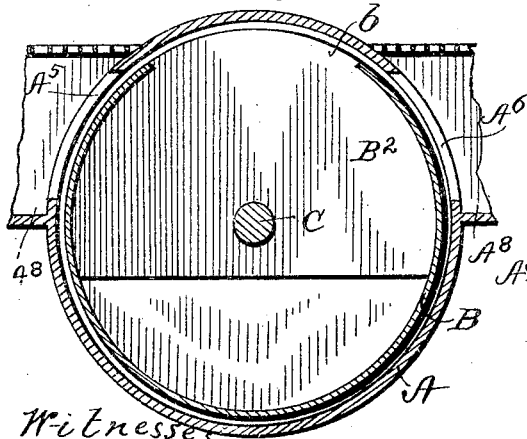
Figure 8:
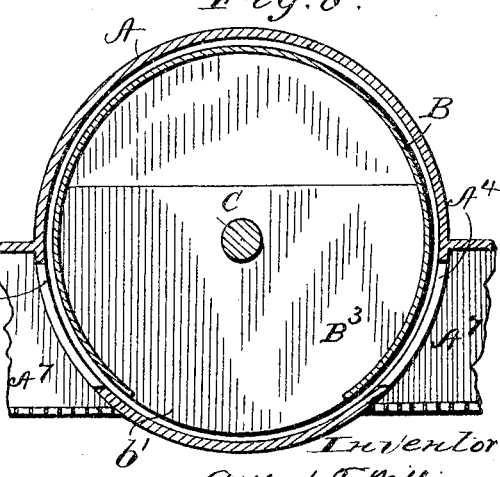

Figures 1 and 2 are perspective views of the improved apparatus, taken from opposite ends. Fig. 3 is a longitudinal vertical section showing parts in elevation. Fig. 4 is an end elevation. Fig. 5 is a perspective view of the inner member or cylinder. Fig. 6 is a longitudinal section of the same. Figs. 7 and 8 are cross-sections on the lines 7 7 and 8 8 of Fig. 3 looking, respectively, in the direction of the arrows. Fig. 9 is a longitudinal section through the outer member or shell. Fig. 10 is a longitudinal vertical section through a modified form of apparatus. Fig. 11 is a sectional elevation on the line 11 11 of Fig. 12. Fig. 12 is a plan view of the same, partly broken away. Fig. 13 is a longitudinal vertical section of another modified form. Fig. 14 is a section on the line 14 14 of Fig. 13; and Fig. 15 is an end elevation showing parts in section, the hoods omitted.

The invention as illustrated comprises an outer element or member and an inner element adjustable and movable relative to the outer element. For convenience the elements are illustrated as of cylindrical formation, and the outer member or element I shall term a "casing," the same being designated at A. The cylinder-casing A is provided with end closing plates $a$ and conveniently formed with bearing-brackets A', centrally located at the ends of the end plate. These brackets, for purposes presently to be stated, are arranged in reverse order, so as to present, respectively, an opening directly upward and downward. The casing is conveniently equipped with a flange $A^2$, located adjacent the center, which serves as an anchoring or attaching plate or shoulder, to which a suitable board or supporting-plate is secured. This board or suitable supporting-plate is omitted from the drawings, but may be of any desired type to fit a window-frame and be held in place by the sash or, if desirable, may be a partition-wall or the lower rail of a window-sash. In the opposite sides of the casing A, slightly below the central plane thereof, are openings $A^3 A^4$, and similar openings $A^5 A^6$ are formed at diagonally opposite points and at the opposite end of the casing. Over these openings are arranged deflector-hoods $A^7 A^8$, the former having open under faces and the latter opening upward. The openings in each case are conveniently but not necessarily screened.

The inner element or, as I shall term it, the "inner cylinder" is represented at B and consists of a cylindrical member having closed ends, from the centers of which project trunnions or hubs B'. This cylinder is loosely mounted on the shaft C, the ends of which are fixedly secured in the vertical portions of the brackets A', conveniently by nuts threaded on the ends of the shaft. The cylinder is cut away at diagonally opposite points, forming openings $b$ $b'$, as shown in Fig. 3, which open in opposite directions—that is to say, one opens upward, while the other opens downward—and being positioned at opposite ends of the cylinder. The openings $b$ and $b'$ are in dimension equal to the openings in the casing A, with which they are intended to register when properly adjusted. Spanning the interior of the cylinder B at the end of the opening $b$ is a deflector-plate $B^2$, the same extending from the top of the cylinder down to a point slightly below the axis thereof, as shown in dotted lines, Fig. 3, and full lines, Figs. 6 and 7. A similar deflector-plate $B^3$ is located at the inner end of the opening $b'$ and extending in an opposite direction from that of the deflector-plate $B^2$ and terminating at a point slightly above the axis of the cylinder. The position of these deflector-plates is such as to form a passage between the same, so that air entering through the opening $b'$ and escaping through the opening $b$ will of necessity have to pass through a tortuous passage, thus preventing a direct or unbroken inflow of the air-currents. To provide an automatic means for adjusting the cylinder within the casing under all conditions to the pressure created by the wind or air resistance on the outside of the structure to which the deflector is applied, a suitable vane D is attached by a standard $d$ to the trunnion or hub B' at what I shall term the "outer" end of the cylinder. The standard of this vane is rigidly attached to the hub and is permitted to swing by the construction of the brackets A'. This movement, it is desired, shall be limited so that when the vane has been moved in one direction until the openings in the cylinder register with the openings in the casing it will be prevented from further deflection. The means employed are conveniently rubber-covered buffer pins or strips $d'$, located on opposite sides of the end plate A', as shown in Fig. 4. The vane D may be of any preferred or desired formation. In Fig. 3 I have shown this vane as simply a flat metal plate. In Figs. 4 and 10 the vane is shown in what I may term the "preferred" form, consisting of concavo-convexed plates arranged back to back supported by the standard. In Fig. 2 the vane is shown as composed of two rectangular plates curved, respectively, in opposite directions. It is obvious that other forms of vanes may be employed.

Obviously under certain conditions it will be necessary or desirable to retain the ventilator in either an open or closed position, checking thereby its automatic action. To accomplish this result, I attach to the hub at the opposite end of the cylinder, which I shall term the "inner" end of the cylinder, an arm E, extending out at right angles and having on its outer end a suitable thumb-screw $e$, passing through the end of the arm and arranged so that its point will engage a track-plate $e'$ on the end of the casing. By adjusting the screw $e$ to impinge against the plate $e'$ the cylinder is prevented from rotating, and in this connection it may be found desirable to have suitable sockets in the plate $e'$ into which the end of the set-screw may enter.

Before describing certain modifications shown I shall proceed to describe the operation of the construction above described. In this connection I shall for convenience sake refer to the ventilator as employed or used on a car; but by so doing I do not wish to be understood that the use is confined in this particular, for it is obvious that the ventilator is either to be actuated by its own movement through the air—as, for instance, on a vehicle or boat—or when the air is moving and the ventilator is held stationary—as, for instance, in a building. It is now recognized that in the art of ventilating it is essential to avoid direct blasts, and, therefore, any deflector or collector which tends to introduce blasts of air directly into the compartment is objectionable. It is also known that what may be termed "rear" or "back" currents of air are induced to enter a compartment notwithstanding the sweep of the air or wind across the rear or back opening of the protruding end of the ventilator and that such counter-currents will flow into the compartment. When the ventilator described is adjusted properly and the currents of air are created or pressure exerted on the left-hand side of the vane shown, the cylinder will be moved, thereby causing the opening $b'$ to register with the opening $A^4$ in the casing and the opening $b$ to register with the opening $A^5$ in the casing, thus having the ingress-opening of the ventilator at the back of the protruding end of the casing. The hoods prevent the deflection of any foreign substances into the openings and entering the casing between the same and the cylinder. The currents of air passing below the front opening in the side of the hood strike the lower deflecting portion of the casing and are thereby deflected and, passing back, will create a back current through the hood at the rear into the rear opening, said current taking a tortuous course through the cylinder and passing out of the diagonally opposite opening located within the compartment or car, the air issuing gently and without force, but in a steady practically regular current. The larger the exposure for the passage of air through the ventilator the greater the amount which will be permitted to pass, and should the train cease moving the ventilator will automatically close to preclude the passage therein of smoke or objectionable vapors; but if it is desired to retain the same open it is only necessary to adjust it through the medium of the arm E and set it in its adjusted position. The reversal of the above is of course necessary when the train is moving in an opposite direction. The automatic regulation of the ventilator is an important factor in the proper ventilation of an apartment.

It is to be understood that the ventilator above described is particulary well adapted for the decks of railway-coaches, and by the use of the inner hoods A⁸ the air-currents passing into the car do so by the rear opening and, besides, are deflected upward, thereby avoiding the possibility of any drafts being thrown onto the heads of any of the passengers. The importance of screening the openings is to prevent the accidental entering or purposeful throwing into them of large particles, such as paper, which would interfere with the working of the ventilator.

An additional feature of the invention resides in the construction wherein the openings in the cylinder B are so proportioned and positioned that a movement of the cylinder in either direction will cause the openings to register with the openings in the casing illustrated in Figs. 7 and 8. By this means should the conditions of the atmosphere justify the inner cylinder can be adjusted so as to cause a direct blast. Such a condition may be found to exist where the atmosphere outside is calm and no wind blowing, and so a greater amount of air is desired for a period of time.

In Figs. 10, 11, 12 I have shown a modified form of construction, the changes relating more particularly to the details than to the principle. In these figures the inner cylinder is shown as being mounted rigidly on the shaft F, which in turn is supported by conical bearings formed on the ends of the adjusting-screws $f$. This method of mounting the inner cylinder is desirable in that a very sensitive bearing is provided, resulting in the prompt, quick, automatic, and slight friction action of the device. In lieu of the side exit-opening it may be found desirable in some cases to have a single exit-opening, which is represented at H in the said figures, the said opening entering directly through the top of the casing and registering with a large single opening F' in the inner cylinder, the remaining features being substantially the same as in the figures heretofore described, with this slight exception, that the inner portion of the inner cylinder is cut away substantially two-thirds of its circumference, as shown in Fig. 11, so that the imperforate portion or side wall F² will not act as a closer for the opening H, which is always left open. The opening H is conveniently closed by lid H'.

The principle disclosed in the above-described figures is also found in the construction shown in Figs. 13 and 14, in which case the inner cylinder K is one-half the length of the casing, the inner end of the casing serving as the passage for the air, which in turn escapes through the opening K' at the top. In this particular construction the opening $k$ in the cylinder is (to any intent) substantially twice that of the openings in the casing and located intermediate the two openings, so that upon the swinging of the cylinder by the vane the opening in the direction of the swing will be disclosed, the opposite one being closed. In this particular construction I have found it expedient to provide a device for locking the cylinder closed, which may often be found necessary when the ventilator is used at the top or in the deck of a car or when applied for stationary ventilation, such as office, house, or hospital purposes. For that purpose I have secured to the shaft carrying the cylinder two arms L, having their outer ends curved outwardly, and between the arms on the casing is a spring-actuated pin M, mounted to slide in suitable brackets $m$ $m'$ on the end of the casing and on any suitable fixture below the casing. Adjacent to the end of the rod M, which is provided with a suitable cap $m^2$, is a cam-lever O, which when moved into a vertical position forces the rod M up between the arms L and holds it in such position. By throwing the lever at right angles, as shown in dotted lines, Fig. 15, the rod M is permitted to be projected downward by the force of the spring N, surrounding the same.

I believe I am the first to provide a ventilator of, which I shall term, the "positive counter-current type," which is automatic in its action, so that the same will be opened by air-pressure and which will be self-regulating to the extent that the opening for the counter ventilating-currents will always be in the proper direction relative to the wind-pressure or upon the wind being from one direction and changing to the opposite direction. It is also evident that should the air-pressure be insufficient to move the vane or cylinder the same may be manipulated by hand and adjusted to full or partial open position.

Having thus described the invention, what I claim as new, and desire to secure by Letters Patent, is—

1. A ventilator comprising in its structure a casing having oppositely-arranged air-inlet openings in its sides and an end discharge-opening, means within the casing for closing one inlet-opening and opening the opposite opening, and means without the casing connected with said closing means for governing the position thereof, substantially as described.

2. In a ventilator, the combination with a casing having air-inlet openings in its sides and an opening in its end, of a movable element within the casing for closing an inlet-opening, and means located without the casing acted upon by air-pressures to adjust said closing means, substantially as described.

3. In a ventilator, the combination with a casing having openings in different sides thereof and an end opening, means for closing one of the openings and opening the other opening, and a vane connected with said closing and opening means for adjusting the same, substantially as described.

4. In a ventilator, the combination with a casing, of lateral air-inlet openings at one end of the casing, air-outlet openings at the opposite end at the sides of the casing, means in the casing for closing an inlet-opening and an outlet-opening, and means without the casing for adjusting said closing means, substantially as described.

5. In a ventilator the combination with a casing having openings in its opposite sides, hoods extending over the openings, shutters for the openings located within the casing, a vane for normally holding the shutters in one position and acted on by wind-pressure to move the shutters to different positions, and stops for limiting the movement of the shutters.

6. In a ventilator the combination with a casing having openings in its opposite sides, shutters for closing the openings, hoods in front of the openings, and a depending standard carrying a vane for normally retaining the shutters in one position and for moving the same into a different position.

7. In a ventilator, the combination with a casing having oppositely-arranged air-inlet openings in its sides, hoods extending over the openings and having open under faces, pivoted means within the casing for closing said openings, and a device located without the casing for adjusting said closing means, substantially as described.

8. In a ventilator, the combination with a casing having air inlet and outlet openings, of a cylinder loosely mounted in the casing and having openings therein registering with said other openings, and a vane located without the casing and connected with said cylinder for adjusting the same within the casing, substantially as described.

9. In a ventilator, the combination with a casing having inlet and outlet ports, of a rotatable cylinder within the casing having an inlet-port, partitions within the casing and a vane connected with the cylinder and located without the casing for adjusting the cylinder, substantially as described.

10. A ventilator comprising a casing having inlet-ports arranged at different points therein, curved deflecting-hoods projected over said ports and opening at an angle thereto, and means carried by the casing for closing one port and opening the opposite port.

11. In a ventilator, the combination with a casing having inlet and outlet ports, of an adjustable element within the casing for closing a port, a vane located without the casing for adjusting said element, and means independent of the vane for adjusting and securing in its adjusted position the element located without the casing, substantially as described.

12. The combination with a casing having inlet-ports, of hoods extending over said ports having open lower faces only, and means for simultaneously closing one port and opening the opposite port, substantially as described.

13. The combination with a casing having inlet and outlet ports, of a cylinder located within the casing for closing a port, means located without the cylinder actuated by wind-pressure for adjusting said closing means, and independent means for locking said closing means in different positions, substantially as described.

14. In a ventilator, the combination with a casing having curved sides and openings in the sides, hoods projecting over and in front of the openings and means actuated by wind-pressure for closing one of the openings.

15. In a ventilator, a casing fashioned to project beyond a support and provided with suitable air-openings, and a deflecting-surface below the plane of the openings, means for closing one opening and opening another opening, and hoods extending over the openings.

16. In a ventilator, a casing having oppositely-arranged openings and a deflecting-surface below the openings, hoods having a single open side projected over the openings, and means actuated by wind-pressure for closing one of the openings.

In testimony whereof I affix my signature in presence of two witnesses.

GILBERT F. WILLIAMS.

Witnesses:
L. S. BACON,
JOHN L. FLETCHER.